(12) United States Patent
Cashatt

(10) Patent No.: US 6,954,046 B2
(45) Date of Patent: *Oct. 11, 2005

(54) METHOD AND APPARATUS TO CONTROL INPUT TO AC INDUCTION MOTORS

(75) Inventor: Jerry D. Cashatt, Winton, CA (US)

(73) Assignee: Enviro World Systems, Inc., Atwater, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/803,361

(22) Filed: Mar. 18, 2004

(65) Prior Publication Data

US 2004/0174134 A1 Sep. 9, 2004

Related U.S. Application Data

(63) Continuation of application No. 10/215,698, filed on Aug. 8, 2002, now Pat. No. 6,737,827, which is a continuation-in-part of application No. 09/832,404, filed on Apr. 10, 2001, now abandoned.

(51) Int. Cl.[7] .............................................. H02P 7/00
(52) U.S. Cl. ...................... 318/432; 318/434; 318/805; 318/727; 323/210; 323/211; 323/205
(58) Field of Search ................................. 318/727, 729, 318/432, 805, 434; 323/210, 211, 205

(56) References Cited

U.S. PATENT DOCUMENTS

| | | | |
|---|---|---|---|
| 3,959,719 A | 5/1976 | Espelage .................... 323/207 |
| 4,052,648 A | 10/1977 | Nola .......................... 318/200 |
| 4,064,419 A | 12/1977 | Peterson ..................... 318/179 |
| 4,344,025 A | 8/1982 | Okuyama et al. ........... 318/729 |
| 4,348,631 A | 9/1982 | Gyugyi et al. .............. 323/211 |
| 4,379,258 A | 4/1983 | Sugimoto .................... 318/805 |
| 4,417,190 A | 11/1983 | Nola .......................... 318/729 |
| 4,439,718 A | 3/1984 | Nola .......................... 318/729 |
| 4,454,462 A | 6/1984 | Spann ........................ 318/729 |
| 4,459,528 A | 7/1984 | Nola .......................... 318/729 |
| 4,459,529 A | 7/1984 | Johnson ...................... 318/729 |
| 4,581,568 A | 4/1986 | Fitzpatrick et al. ......... 318/729 |
| 4,677,364 A | 6/1987 | Williams et al. .............. 322/47 |
| 4,710,692 A | 12/1987 | Libert ........................ 318/729 |
| 4,767,975 A | 8/1988 | Unsworth .................... 318/729 |
| 4,780,660 A | 10/1988 | Shima et al. ................ 323/207 |
| 4,833,628 A | 5/1989 | Curran, Jr. .................. 364/550 |
| 4,912,390 A | 3/1990 | Curran, Jr. et al. ......... 318/812 |
| 4,950,970 A | 8/1990 | Davis, Jr. et al. ........... 318/809 |
| 5,075,613 A | 12/1991 | Fisher ........................ 318/809 |
| 5,134,356 A | 7/1992 | El-Sharkawi et al. ....... 323/211 |
| 5,187,427 A | 2/1993 | Erdman ...................... 323/207 |
| 5,241,256 A | 8/1993 | Hatanaka et al. ........... 318/801 |
| 5,471,127 A | 11/1995 | Vaughan et al. ............ 318/809 |
| 5,684,377 A | 11/1997 | Kim et al. .................. 318/799 |
| 5,723,966 A | 3/1998 | Straka et al. ................ 318/650 |
| 5,818,238 A | 10/1998 | DeVilbiss .................... 324/537 |

Primary Examiner—Rina Duda
(74) Attorney, Agent, or Firm—Johnson & Stainbrook LLP; Craig M. Stainbrook; Larry D. Johnson

(57) ABSTRACT

One embodiment of the present invention is a method to control input to an alternating current (AC) induction motor from a power supply that includes steps of: (a) determining a measure of reactive power (VAR) in two input lines to the motor during a time period; and (b) maintaining an SSR (solid state relay) connected in series between the power supply and the motor in a non-conducting state for a subsequent time period, the length of which subsequent time period is determined by analyzing the measure of VAR.

3 Claims, 1 Drawing Sheet

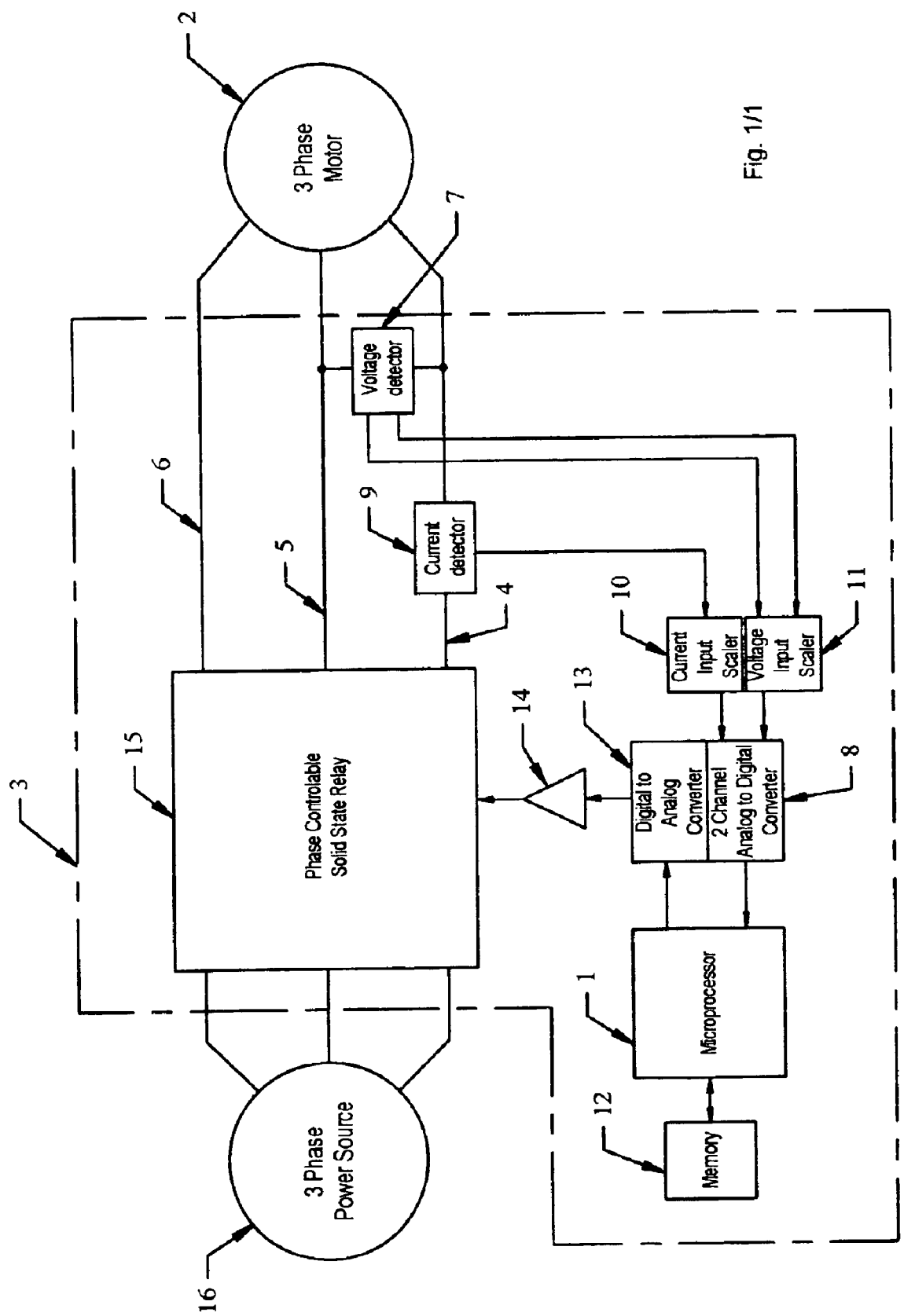
Fig. 1/1

METHOD AND APPARATUS TO CONTROL INPUT TO AC INDUCTION MOTORS

TECHNICAL FIELD OF THE INVENTION

This is a continuation of a patent application entitled "Method and Apparatus to Control Input to AC Induction Motors" having Ser. No. 10/215,698 which was filed on Aug. 8, 2002 now U.S. Pat. No. 6,737,827, which patent application was a continuation-in-part of a patent application entitled "Motor Load Controller for AC Induction Motors" having Ser. No. 09/832,404 which was filed on Apr. 10, 2001 now abandoned, which patent applications are incorporated herein by reference.

1. Technical Field of the Invention

One or more embodiments of the present invention pertain to method and apparatus to control input to alternating current (AC) induction motors, and in particular, to control input to single-phase and three-phase AC induction motors.

2. Background of the Invention

As is well known, power is wasted when an alternating current (AC) induction motor is operated using a load below its rated load, or using a varying load.

U.S. Pat. Nos. 4,439,718 and 4,052,648 (the "Nola patents") disclose methods for controlling power applied to an AC induction motor operating under varying loads based upon an evaluation of a displacement phase angle between voltage and current wave forms as they respectively reach zero value. The disclosed methods are effective only if the waveforms are purely sinusoidal, and, in actuality, such waveforms are rarely purely sinusoidal.

U.S. Pat. No. 4,379,258 (the "Sugimoto patent") discloses a power control circuit used to control voltage applied to an AC induction motor operating under varying load. The circuit detects supply power (equal to a product of an instantaneous value of voltage applied to the motor and current flowing through the motor, when the product is positive) and feedback power (equal to a product of an instantaneous value of voltage applied to the motor and current flowing through the motor, when the product is negative) flowing between a power supply and the motor. Further, Sugimoto discloses that the circuit controls the voltage applied to the motor such that a ratio between the supply power and the feedback power is maintained at a predetermined value. The disclosed circuit may be problematic because it is believed that the use of a predetermined value may need to be adjusted for various motors. In addition, the specific value stated by Sugimoto does not give the maximum savings possible.

In light of the above, there is a need for improved methods and apparatus to control power input to AC induction motors.

SUMMARY OF THE INVENTION

One or more embodiments of the present invention advantageously satisfy the above-identified need. In particular, one embodiment of the present invention is a method to control input to an alternating current (AC) induction motor from a power supply that comprises steps of: (a) determining a measure of reactive power (VAR) in two input lines to the motor during a time period; and (b) maintaining an SSR (solid state relay) connected in series between the power supply and the motor in a non-conducting state for a subsequent time period, the length of which subsequent time period is determined by analyzing the measure of VAR.

BRIEF DESCRIPTION OF THE FIGURE

FIG. 1 is a block diagram of a circuit that is fabricated in accordance with one or more embodiments of the present invention for use with a three-phase alternating current (AC) induction motor.

DETAILED DESCRIPTION

As is well known, for single-phase, or three-phase, alternating current (AC) induction motors, when voltage and current input to the motor are plotted on a point-by-point basis with, for example, a vertical axis (Y, also known as the ordinate) representing magnitude and a horizontal axis (X, also known as the abscissa) representing time, separate waveforms exist for voltage and current. These waveforms are generally sinusoidal, but may contain multiple harmonics.

When voltage and current values are taken from their respective waveforms and multiplied on a point-by-point basis along the X-axis, a voltampere (VA) waveform is generated. When plotted along the X and Y axes, the VA waveform will generally have positive and negative values with reference to the X-axis (i.e., portions of the VA waveform that lie above the X axis are taken as being positive in value, and portions of the VA waveform that lie below the X-axis are taken as being negative in value).

During operation of such single-phase or three-phase AC induction motors, movement of rotors relative to motor windings, produces reactive power also known as (VAR) or "voltamperes reactive" which is taken as having a negative value. As such, VAR constitutes portions of the VA waveform that lie below the X-axis.

If a mechanical load imposed upon an AC induction motor has a value that is equivalent to the rated load capacity of the motor, the motor would purportedly operate at maximum efficiency. However, VAR is present regardless of whether or not the motor is being operated at its rated load because the motor produces VAR due to the motor's inherent physical characteristics and relative movement of the motor's rotors and windings. VAR that is present when the motor is operated with a load that is equal to its rated load capacity is referred to as "inherent VAR." Further, whenever an induction motor is operated with a load that is less than its rated load capacity, additional VAR exists in the VA waveform. This VAR is referred to as "excess VAR."

FIG. 1 is a block diagram of circuit 3 that is fabricated in accordance with one or more embodiments of the present invention for use with a three-phase AC induction motor. The electrical components shown in FIG. 1 are readily accessible, off-the-shelf components (for example, and without limitation, microprocessor 1 can be any one or a number of conventional microprocessors).

As shown in FIG. 1, three-phase motor 2 is connected to circuit 3, and circuit 3 is connected, in turn, to three-phase power supply 16 (circuit 3 and motor 2 are conventionally grounded, however, the ground connections are not shown as such provisions would be obvious to those of ordinary skill in the art). In accordance with one or more embodiments of the present invention, voltage associated with any two of three input lines (4, 5, or 6) to the windings of motor 2 is detected by conventional voltage detector 7. Voltage detector 7 is a type of conventional voltage detector that maintains voltage it detects at, or adjusts the voltage it detects to, a magnitude that is compatible with voltage input scaler 11. For example, as one of ordinary skill in the art can readily appreciate, a conventional voltage divider (not shown) within voltage detector 7 can be used to provide this function in a manner that is well known to those of ordinary skill in the art.

As further shown in FIG. 1, current associated with any one of the two input lines being examined for their voltage values is detected by conventional current detector 9. Current detector 9 is a type of conventional current detector that transforms current passing through it to a voltage signal that is: (a) representative of the current; and (b) compatible in magnitude with current input scaler 10. For example, as one of ordinary skill in the art can readily appreciate, a conventional transformer and burden resistor (both of which are not shown) within current detector 9 can be used to provide this function in a manner that is well known to those of ordinary skill in the art. When choosing the input line from which to obtain current samples, one should choose the line wherein current lags voltage. This may be done in accordance with any one of a number of methods that are well known to those of ordinary skill in the art.

As further shown in FIG. 1, a voltage signal representative of current output from current detector 9 is applied as input to conventional current input scaler 10. Current input scaler 10 maintains the magnitude of the voltage signal at a level appropriate for receipt by analog-to-digital converter 8 in accordance with a rated capacity of analog-to-digital converter 8, and applies the voltage signal as input to analog-to-digital converter 8. As further shown in FIG. 1, voltage detector 7 applies the voltages detected in, for example, and without limitation, lines 4 and 5, as input to voltage input scaler 11. Voltage input scaler 11 takes the vector sum of the two detected voltages, adjusts the vector sum to a value that is compatible with the rated input capacity of analog-to-digital converter 8, and applies that value as input to analog-to-digital converter 8.

In accordance with one or more alternative embodiments of the present invention, voltage detector 7 would detect a vector sum of voltage across any two of lines 4, 5, or 6, and apply the detected vector sum as input to a voltage input scaler. Then, the voltage input scaler would adjust the input to a value that is compatible with the rated input capacity of analog-to-digital converter 8, and apply the value as input to analog-to-digital converter 8.

Analog-to-digital converter 8 samples the analog signals applied as input from current input scaler 10 and voltage input scaler 11, respectively, and converts the samples into digital numbers that are representative of the amplitudes of the analog signals (for example, and without limitation, in a binary format). Such samples are created at a rate, for example, and without limitation, in a range from about 32 to about 64 kHz. Next, as shown in FIG. 1, analog-to-digital converter 8 applies the digital numbers as input to microprocessor 1.

Although the description above relates to one or more embodiments of the present invention that control input to a three-phase AC induction motor, such embodiments are similar to one or more embodiments of the present invention that control input to a single-phase AC induction motor. These similarities can be understood with reference to FIG. 1 and the discussion below. For embodiments that control input to a single-phase motor: (a) a single-phase solid state switch (SSR) is used in place of three-phase SSR 15, digital-to-analog converter 13 and operational amplifier 14 shown in FIG. 1; (b) a single-phase power supply is used in place of three-phase power supply 16 shown in FIG. 1; and (c) a single-phase motor is used in place of three-phase motor 2 shown in FIG. 1. In addition, a voltage across two input lines to the single-phase motor is detected, and a current in one of the two input lines is detected.

In accordance with one or more embodiments of the present invention, microprocessor 1 in circuit 3 (or in its analogous circuit that controls input to a single phase motor) analyzes the input samples of voltage and current to determine a measure of VAR in the VA waveform over a time period. For example, VAR appears in the VA waveform whenever voltage is negative and current is positive, and VAR appears in the VA waveform whenever voltage is positive and current is negative. Then, in accordance with the one or more embodiments of the present invention, the measure of VAR is analyzed to control input to the motor by maintaining the SSR in a non-conducting state (i.e., acting as an open circuit) during a subsequent time period. In particular, the subsequent time period during which the SSR is non-conducting is determined by analyzing the measure of VAR. As one can readily appreciate from this, maintaining the SSR in a non-conducting state during a subsequent time period in accordance with one or more embodiments of the present invention, advantageously produces significant energy savings and a reduction of operating expenses.

In accordance with some embodiments of the present invention, the measure of VAR may be an average value of VAR taken over a predetermined number of cycles of the VA waveform. In accordance with some further embodiments of the present invention, the measure of VAR may be an average value of VAR taken over a portion of a cycle of the VA waveform. In fact, the measure of VAR may be determined in any number of ways, and a length of the subsequent time period during which the SSR is non-conducting may be determined by analyzing the measure of VAR in any number of ways.

The following describes a method of determining a measure of VAR, and a method of analyzing the measure of VAR to determine a length of the subsequent time period during which the SSR is non-conducting.

Description of the Method for use with a Single-Phase Motor

As is well known, after a voltage (for example, +5V) is applied to a typical single-phase SSR to turn it on (i.e., to drive it to be conducting), it will remain on (i.e., conducting current) until the current reaches zero (at which point it turns off (i.e., becomes non-conducting)). This is the case even if a voltage (for example, 0V) is applied to the SSR to turn it off (i.e., to drive it to be non-conducting) after it has been turned on.

Whenever microprocessor 1 (in response to a program stored in memory 12) detects that the voltage has crossed zero by detecting a change from a positive value to a negative value, microprocessor 1 takes the following actions. Microprocessor 1 applies a turn-off signal (for example, 0V) to the single-phase SSR. In response, the single-phase SSR will remain on (i.e., conducting current) until the current reaches zero, and at that point, the SSR will turn off (i.e., it will not be conducting current). However, prior to the current reaching zero, whenever the voltage sample is negative and the current sample is positive, microprocessor 1 multiplies the voltage sample and the current sample to obtain a VAR value. Microprocessor 1 stores the VAR value if its magnitude is larger than a "last stored VAR value," and discards it if it is not. As such, microprocessor 1 determines the maximum VAR value observed during a time period when the voltage is negative and the current is positive.

Whenever microprocessor 1 detects that the voltage has crossed zero by detecting a change from a negative value to a positive value, microprocessor 1 takes the following actions. Microprocessor 1 applies a turn-off signal (for example, 0V) to the single-phase SSR. In response, the single-phase SSR will remain on (i.e., conducting current) until the current reaches zero, and at that point, the SSR will turn off (i.e., it will not be conducting current). Next, microprocessor 1 compares the stored maximum VAR value obtained during the previous time period when voltage was negative and current was positive with a predetermined constant (for example, hexadecimal 5A, where the predetermined constant may be determined routinely by one of ordinary skill in the art without undue experimentation). If the stored maximum VAR value is greater than the predetermined constant, a timer value is increased by a single-phase predetermined amount (for example, hexadecimal 23, where the single-phase predetermined amount may be determined routinely by one of ordinary skill in the art without undue experimentation to provide a reasonable response time). If the stored maximum VAR value is less than the predetermined constant, the timer value is decreased by the single-phase predetermined amount (this is done to prevent decreasing input to motor 2 to such a large extent that it may stall. If the stored maximum VAR value is equal to the predetermined constant, the timer value is unchanged (at initialization, the timer is set to a predetermined timer value). Next, microprocessor 1 resets the stored maximum VAR value, for example, to zero so that microprocessor 1 will be ready to determine the maximum VAR value observed during the next time period when voltage is negative and current is positive.

Whenever microprocessor 1 detects that the current has crossed zero by detecting: (a) a change from a positive value to a negative value or zero; or (b) by detecting a change from a negative value to a positive value or zero, microprocessor 1 takes the following actions. Microprocessor 1 sets the timer value into a counter that is counted down to zero in accordance with a clock (not shown) in microprocessor 1. For example, in accordance with one specific embodiment of the present invention, the counter is decremented once every ten (10) "ticks" or cycles of the clock. Next, in response to an interrupt that occurs when the counter reaches zero, microprocessor 1 applies a signal (for example, +5V) as input to the SSR to cause it to trigger (i.e., to cause it to become conducting). As one can readily appreciate, since the SSR is in series with the motor phase lines, during the period of time that the SSR is non-conducting (or off), power has been removed from motor 2.

Description of the Method for use with a Three-Phase Motor

As is well known, a typical three-phase SSR (SSR 15) that is on (i.e., conducting) will turn off when the current reaches zero. However, if a signal having an amplitude in a range between 0V and +5V is applied thereto, it will turn on (i.e., become conducting) after a time delay that is determined by the amplitude of the signal. For one particular example, the closer the amplitude of the signal is to 0V, the longer the time delay before SSR 15 is triggered (i.e., caused to be conducting). Conversely, the closer the amplitude of the signal is to +5V, the shorter the time delay before SSR 15 is triggered (i.e., caused to be conducting). In accordance with one or more embodiments of the present invention, microprocessor 1 causes the signal to be applied to SSR 15 by applying a DAC value (the DAC value will described in detail below) as input to digital-analog converter 13. Digital-to-analog converter 13 converts the DAC value into an analog voltage, and the analog voltage is applied as input to operational amplifier 14. In response, operational amplifier 14 applies the signal (for example and without limitation, a voltage having an amplitude in a range between 0V and +5V), i.e., a voltage that reflects the DAC value, as input to SSR 15.

Whenever microprocessor 1 (in response to a program stored in memory 12) detects that the voltage has crossed zero by detecting a change from a positive value to a negative value, microprocessor 1 takes the following action. Prior to the current reaching zero (in which case SSR 15 will turn-off), whenever the voltage sample is negative and the current sample is positive, microprocessor 1 multiplies the voltage sample and the current sample to obtain a VAR value. Microprocessor 1 stores the VAR value if its magnitude is larger than a "last stored VAR value," and discards it if it is not. As such, microprocessor 1 determines the maximum VAR value observed during a time period when the voltage is negative and the current is positive.

Whenever microprocessor 1 detects that the voltage has crossed zero by detecting a change from a negative value to a positive value, microprocessor 1 takes the following actions. Microprocessor 1 compares the stored maximum VAR value obtained during the previous time period when voltage was negative and current was positive with a predetermined constant. If the stored maximum VAR value is greater than the predetermined constant, a DAC value is decreased by a three-phase predetermined amount (for example, hexadecimal 80, where the three-phase predetermined amount may be determined routinely by one of ordinary skill in the art without undue experimentation to provide a reasonable response time). If the stored maximum VAR value is less than the predetermined constant, the DAC value is increased by the three-phase predetermined amount (this is done to prevent decreasing input to motor 2 to such a large extent that it may stall). If the stored maximum VAR value is equal to the predetermined constant, the DAC value is unchanged (at initialization, the DAC value is set to a predetermined DAC value). Next, microprocessor 1 resets the stored maximum VAR value, for example, to zero so that microprocessor 1 will be ready to determine the maximum VAR value observed during the next time period when voltage is negative and current is positive. Next, microprocessor 1 applies the DAC value as input to digital-analog converter 13.

As was described above, whenever the current through three-phase SSR 15 reaches zero, it is re-driven (i.e., caused to be conducting) after a delay that depends on the amplitude of the signal applied thereto, which amplitude depends on the DAC value output from microprocessor 1. For this particular example, the smaller the DAC value, the longer the delay before SSR 15 is re-driven after the current reaches zero. Conversely, the larger the DAC value, the shorter the delay before SSR 15 is re-driven after the current reaches zero. As one can readily appreciate, since SSR 15 is in series with motor phase line 4, 5, and 6, during the period when SSR 15 is non-conducting (or off), power is been removed from motor 2.

As one can readily appreciate from the embodiments described in detail above, the length of time during which the SSR is non-conducting is developed using a value of VAR that is determined when the voltage is negative and the current is positive. However, it should be understood that embodiments of the present invention are not limited to this embodiment. In fact, further embodiments exist wherein separate lengths of time may be developed when voltage is negative and current is positive and when voltage is positive and current is negative. In addition, still further embodiments of the present invention exist wherein algorithms other than those disclosed above may be utilized to determine the length of time during which the SSR is non-conducting. For example, it is also contemplated that one could utilize algorithms that analyze average values of VAR obtained during portions of the VA waveform over one or more periods of time.

Although the above-described embodiment for use with a single-phase motor utilized a microprocessor to control the single-phase SSR directly in conjunction with its internal timer operation, further embodiments of the present invention exist wherein this is not the case. For example, if a single-phase SSR were utilized in conjunction with a linear proportional controller, such an embodiment for use with a single-phase motor would operate in the, same manner as that described above for the three-phase motor. In particular, the added cost of a linear proportional controller might be required for use with a processor that does not have an internal timer.

Those skilled in the art will recognize that the foregoing description has been presented for the sake of illustration and description only. As such, it is not intended to be exhaustive or to limit the invention to the precise form disclosed.

What is claimed is:

1. A method to control input to an alternating current (AC) induction motor from a power supply that comprises steps of:
   determining a measure of reactive power (VAR) in two input lines to the motor during a time period; and
   maintaining an SSR (solid state relay) connected in series between the power supply and the motor in a non-conducting state for a subsequent time period, the length of which subsequent time period is determined by analyzing the measure of VAR.

2. The method of claim 1 further comprising a step of driving the SSR to be conducting after the subsequent time period.

3. A method to control input to an alternating current (AC) induction motor from a power supply that comprises the steps of::
   determining a measure of reactive power (VAR) in at least one input line to the motor during a time period; and
   maintaining an SSR (solid state relay) connected in series in said input line between the power supply and the induction motor in a non-conducting state for a subsequent time period, the length of which subsequent time period is determined by analyzing the measure of VAR.

* * * * *